United States Patent
Taylor

(10) Patent No.: US 10,915,755 B2
(45) Date of Patent: Feb. 9, 2021

(54) ALIGNMENT-FREE VIDEO CHANGE DETECTION USING DEEP BLIND IMAGE REGION PREDICTION

(71) Applicant: CANON KABUSHIKI KAISHA, Tokyo (JP)

(72) Inventor: Geoffrey Richard Taylor, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 16/216,868

(22) Filed: Dec. 11, 2018

(65) Prior Publication Data

US 2020/0184224 A1    Jun. 11, 2020

(51) Int. Cl.
*G06K 9/00*    (2006.01)
(52) U.S. Cl.
CPC ..... *G06K 9/00718* (2013.01); *G06K 9/00744* (2013.01); *G06K 9/00758* (2013.01); *G06K 9/00771* (2013.01)
(58) Field of Classification Search
CPC .............. G06K 9/6215; G06K 9/00671; G06K 9/4604; G06K 9/00771; G06K 9/00147; G06K 9/00624; G06K 9/00744; G06K 9/00718; G06K 9/00758; G06K 2009/6213; G06K 9/6201; G06K 9/6202; G06K 9/6203; G06K 9/6204; G06K 9/6206; G06K 9/6209; G06K 9/621; G06K 9/6211; G06K 9/6212; G06K 9/6214
See application file for complete search history.

(56) References Cited

U.S. PATENT DOCUMENTS

| | | | |
|---|---|---|---|
| 8,831,284 B2 | 9/2014 | Thueux et al. | |
| 2009/0119010 A1* | 5/2009 | Moravec | G05D 1/0251 701/533 |
| 2011/0222781 A1* | 9/2011 | Nguyen | G06K 9/6249 382/218 |
| 2017/0264877 A1* | 9/2017 | Lee | H04N 5/23238 |

OTHER PUBLICATIONS

Chris Stauffer, et al., "Adaptive background mixture models for real-time tracking", CVPR, 1999, CITX/593332, Date of Conference: Jun. 23-25, 1999, Date Added to IEEE Xplore: Aug. 6, 2002, Print ISSN: 1063-6919.

Georgios D. Evangelidis, et al., "Efficient Subframe Video Alignment Using Short Descriptors", IEEE Transactions on Pattern Analysis and Machine Intelligence, vol. 35, No. 10, Oct. 2013.

* cited by examiner

*Primary Examiner* — Allahyar Kasraian
(74) *Attorney, Agent, or Firm* — Canon U.S.A., Inc. IP Division

(57) ABSTRACT

A method of detecting a change in a scene between images that capture a scene at different times, the images comprising reference images and a query image, the method includes reconstructing the query image using a reconstruction model, the reconstruction model being based on the reference images and detecting a change in the scene by comparing the query image with the reconstructed query image.

13 Claims, 11 Drawing Sheets

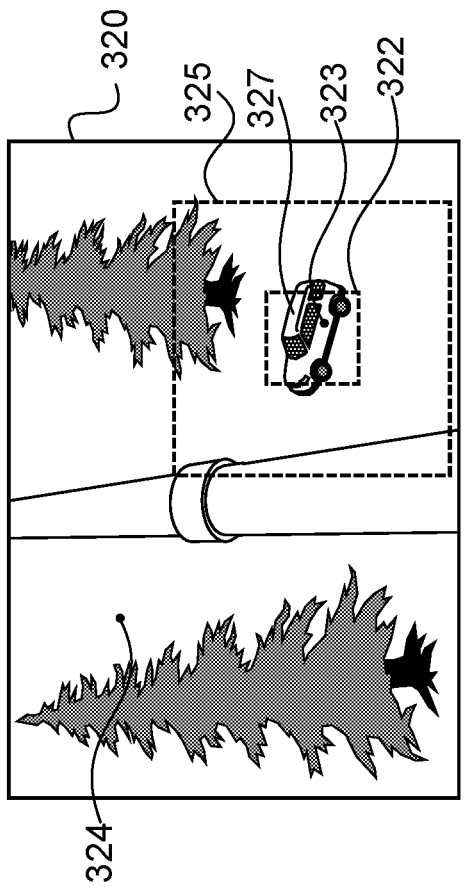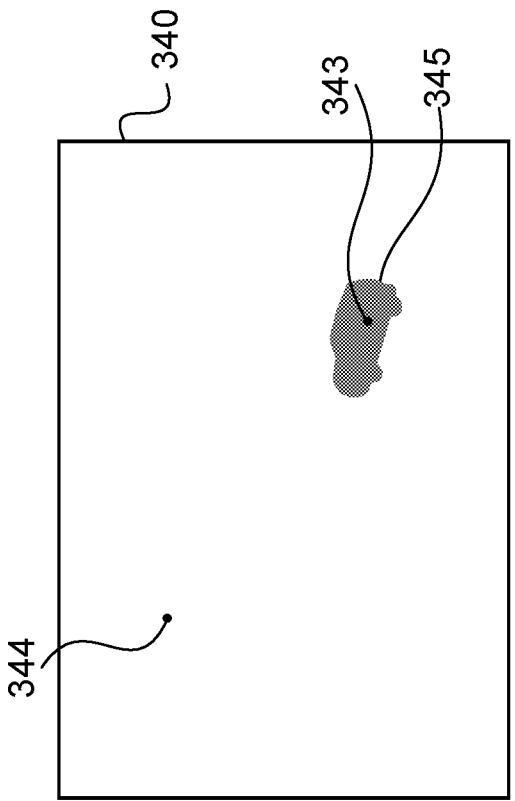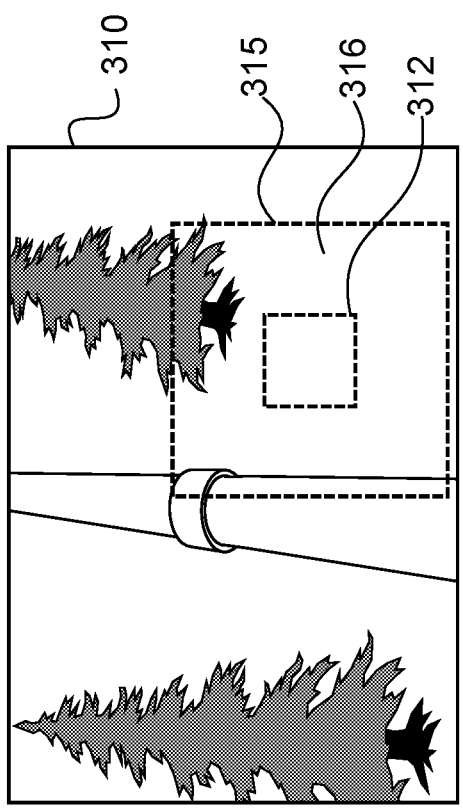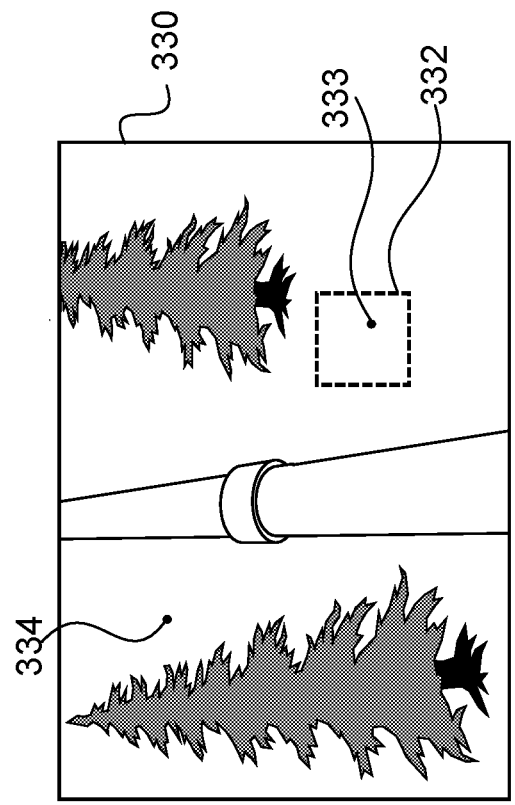
Fig. 3A
Fig. 3B
Fig. 3C
Fig. 3D

ALIGNMENT-FREE VIDEO CHANGE DETECTION USING DEEP BLIND IMAGE REGION PREDICTION

TECHNICAL FIELD

The present description relates generally to image processing and, in particular, to detecting a change in a scene by comparing image sequences of the scene captured by respective moving cameras. The present description also relates to a computer program product including a computer readable medium having recorded thereon a computer program for detecting a change in a scene by comparing image sequences of the scene captured from moving cameras.

BACKGROUND

Public venues such as shopping centres, parking lots and train stations are increasingly subject to surveillance using large-scale networks of video cameras. Application domains of video surveillance include security, safety, traffic management and business analytics. The large volume of video generated by camera networks necessitates automated methods, known as "video analytics", to identify objects and events of interest and bring those to the attention of a user. A fundamental task in video analytics, known as "change detection", is to determine which parts of a scene changed over time. Additional analysis, such as tracking and classification, are typically applied to parts of a scene that are determined to have changed.

Methods for change detection in static cameras are available. In one method called "background subtraction", a background model of a scene viewed by a static camera is formed by estimating the distribution of pixel values at each image location according to a mixture of Gaussians model. Given a test frame, each pixel is classified as "background" if the pixel value has high likelihood according to the background model, otherwise the pixel is labelled as "foreground". Foreground pixels are clustered into connected regions to detect moving objects. A drawback of this method is that the camera must remain stationary, otherwise the distributions at different pixel locations are mixed together and cannot be used to separate foreground from background.

For video surveillance across large geographic areas, networks of static video cameras are not practical, especially in remote locations where power and network infrastructure are limited. Applications of remote video surveillance include agricultural monitoring, critical infrastructure monitoring, border protection and search and rescue. In one method, surveillance cameras are mounted on an airborne drone that conducts periodic patrolling of a railway track along a fixed route. As noted above, conventional background subtraction methods cannot be used to detect scene changes in this scenario since the camera is constantly moving.

One method for change detection from a moving camera is to compare two image sequences of a scene captured by the moving camera at different times, for example during different patrols of a drone along the same fixed route. The problem of comparing two image sequences of a scene in order to detect changes will be referred to as "video change detection" throughout this disclosure. Furthermore, the first image sequence will be referred to as the "reference" sequence and the second image sequence will be referred to as the "query" sequence throughout this disclosure.

Video change detection is challenging for several reasons. Firstly, each frame from a moving camera captures a different part of the overall scene, so that a given frame from the reference sequence may not correspond to the same part of the scene as a given frame from the query sequence. Secondly, the movement trajectory of the camera and thus camera viewpoint may change between the two videos due to localization error and environmental conditions. A change in viewpoint causes parts of a scene to shift relative to other parts, which is known as "parallax error" and can be falsely detected as a change in the scene. Lastly, the reference and query sequences may be captured in different environmental conditions, producing changes in observed brightness, shadows and reflections that can also be falsely detected as scene changes.

The above challenges may be addressed by determining a temporal and spatial alignment of the reference and query sequences. In one method, a temporal alignment is determined by computing a low-dimensional feature vector for each frame, and finding the nearest-neighbour reference frame for each query frame in the feature space using an efficient search algorithm. Given a pair of nearest-neighbour frames, a spatial alignment is performed by determining a pixel correspondence based on estimating a local homography between image patches. Finally, scene changes are detected by computing the difference between aligned pixels. A drawback of this method is that it cannot distinguish changes in the scene from changes due to parallax error caused by a change in the viewpoint between the reference and query videos. Another drawback of this method is that the computational cost of temporal alignment increases in proportion to the length of the reference sequence. This may amount to a significant cost for large scale practical applications such as border protection or gas pipeline monitoring. Yet another drawback of this method is that it cannot distinguish changes in the scene from changes due to lighting, shadows and reflections that result when the reference and query sequences are captured in different weather conditions.

In another method, a temporal and spatial alignment is established by tracking a pre-determined region of interest (ROI) in both the reference and query videos, and associating key frames corresponding to specific viewpoints with a viewpoint identifier, such as a Global Positioning System (GPS) location. Key frames from the reference sequence are used to learn a low-dimensional eigenspace. Key frames from the reference and query sequences with corresponding viewpoint identifiers are projected into the eigenspace, and a distance between the projected points is computed. If the distance is greater than a threshold, the scene is determined to have changed. A drawback of this method is that the method requires the reference and query sequences to be captured from substantially the same viewpoint. In practice, this can be difficult to achieve since localization methods such as GPS have an error of up to several metres. Another drawback is that the comparison is performed in eigenspace rather than the original image and does not localize specific changes within the ROI. Yet another drawback is that it requires a pre-determined ROI to be tracked in both the reference and query sequences. Changes outside the ROI are not detected.

SUMMARY

It is an object of the present invention to substantially overcome, or at least ameliorate, one or more disadvantages of existing arrangements.

Disclosed are arrangements, referred to as Alignment-free Video Change Detection (AVCD) arrangements, which seek to address the above problems by reconstructing a query image using an image patch predictor trained on a reference video sequence, and detecting scene changes by comparing the reconstructed query image to the original query image.

According to one aspect of the present disclosure, there is provided a method of detecting a change in a scene between images that capture a scene at different times, the images comprising reference images and a query image, the method comprising: reconstructing the query image using a reconstruction model, the reconstruction model being based on the reference images; and detecting a change in the scene by comparing the query image with the reconstructed query image.

BRIEF DESCRIPTION OF THE DRAWINGS

One or more embodiments of the invention will now be described with reference to the following drawings, in which:

FIGS. 3A, 3B, 3C and 3D collectively illustrate an example of detecting a change in a scene according to one AVCD arrangement;

DETAILED DESCRIPTION INCLUDING BEST MODE

Figure 1A:
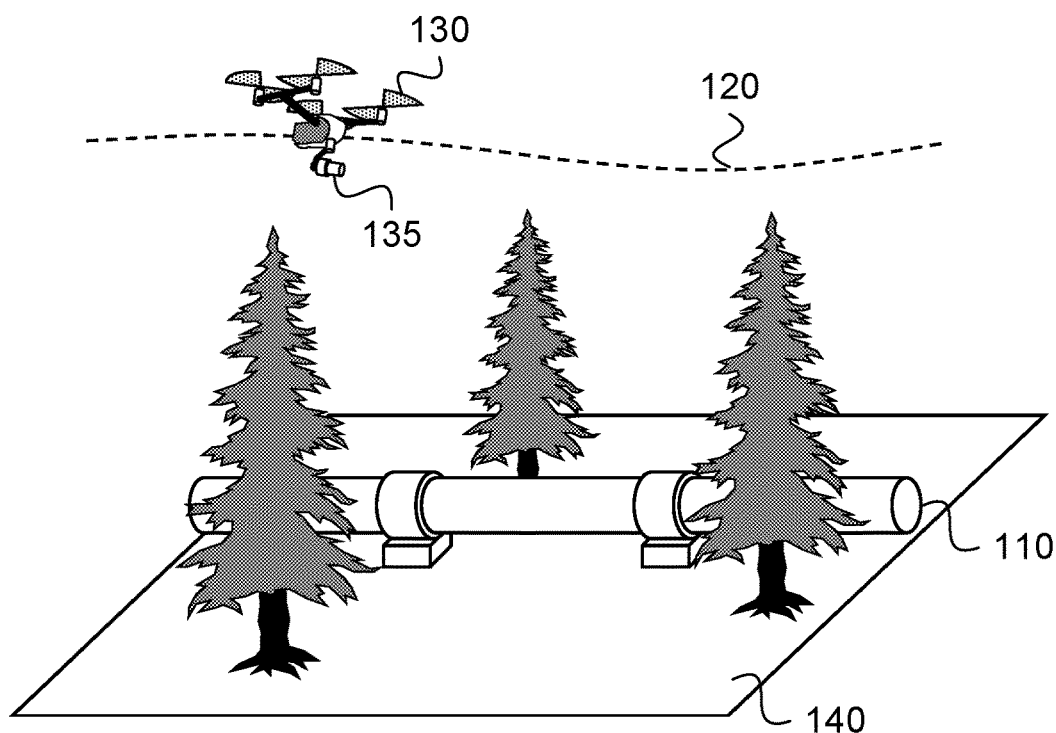
FIGS. 1A and 1B collectively illustrate an example of a moving camera capturing two image sequences of a scene at different times, to which AVCD arrangements may be applied.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

Context

An image, such as the image 310 in FIG. 3, is made up of visual elements. The terms "pixel", "pixel location" and "image location" are used interchangeably throughout this specification to refer to one of the visual elements in a captured image. Each pixel of an image is described by one or more values, collectively called a "pixel value", characterising a property of the scene captured in the image. The pixel value may include a single intensity value (which characterises the brightness of the scene at the pixel location), a triplet of values (which characterise the colour of the scene at the pixel location) and the like.

Figure 8:
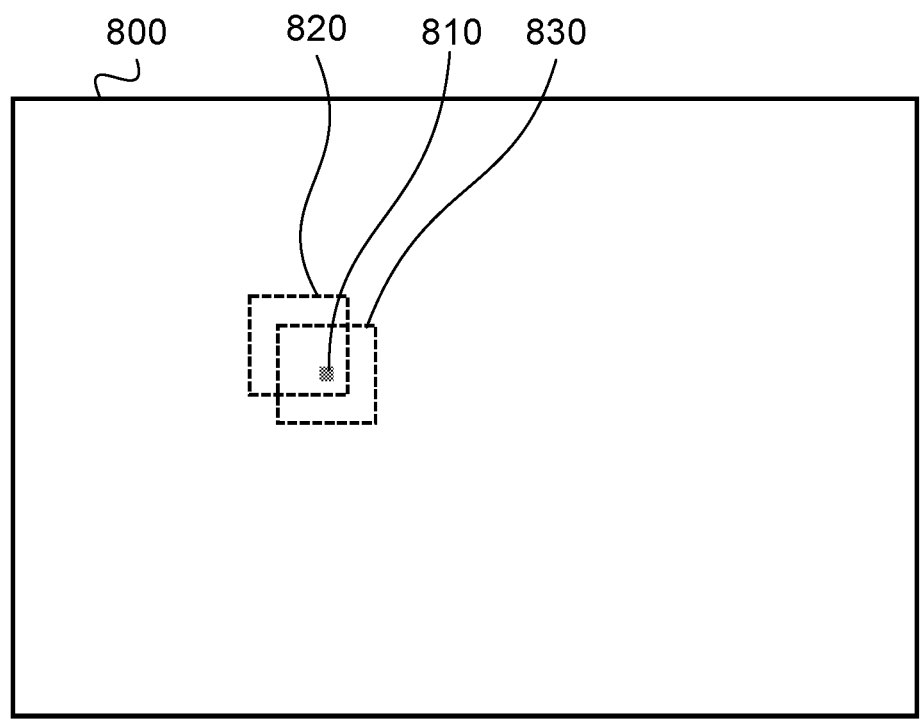
FIG. 8 illustrates an example of selecting a predicted pixel value at a pixel location as used in the sub-process of FIG. 7.

A "patch", "image patch" or "region" in an image, such as the patch 820 in FIG. 8, refers to a collection of one or more spatially adjacent visual elements. A "key point" in an image is a local image structure that has a well-defined location and can be detected with high repeatability despite local perturbations such as brightness change or geometric deformation. One example of a key point is a "corner", which is a local image structure characterised by image gradients in multiple directions. Another example of a key point is a "blob", which is a local image structure characterised by high contrast between a central region and surrounding region. A "bounding box" refers to a rectilinear boundary circumscribing a patch, region, key point or object in an image, such as the bounding box 322 in FIG. 3B. A "feature" or "image feature" represents a derived value or set of derived values determined from the pixel values in a patch. Examples of a feature or an image feature includes a histogram of colour values in a patch, a histogram of quantized image gradient responses in a patch, a set of activations at a particular layer of an artificial neural network applied to the patch, and the like.

Figure 1B:
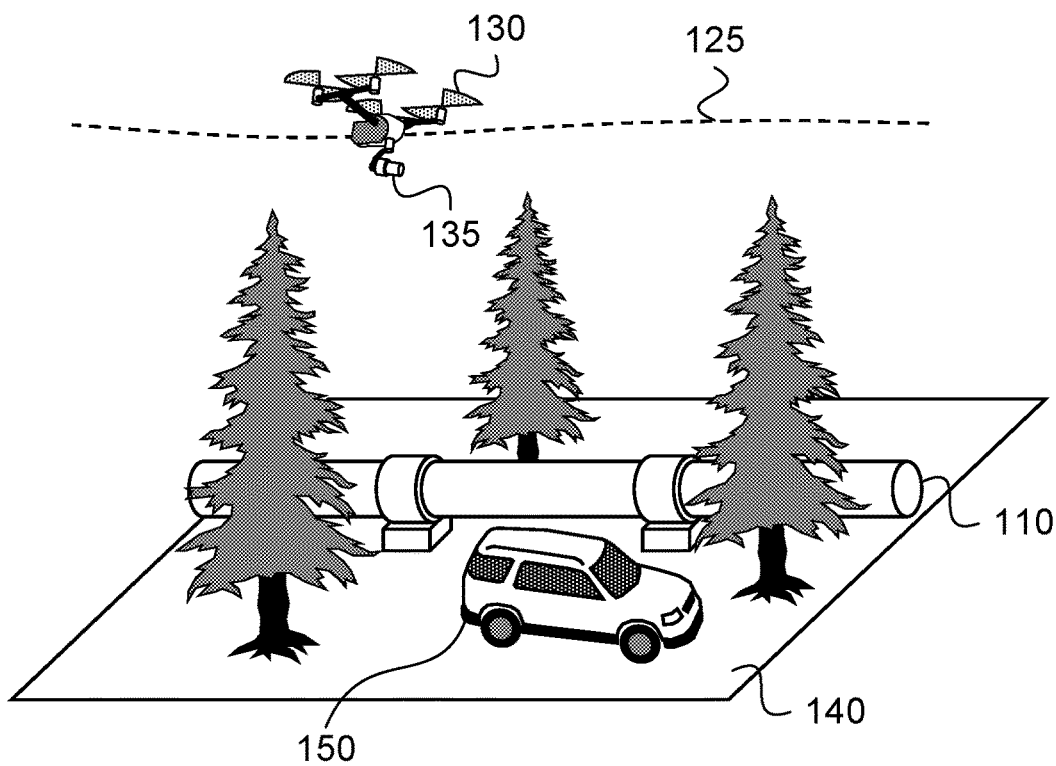

The present disclosure provides a method of comparing a reference image sequence and a query image sequence captured at different times in order to determine a change in a scene. FIGS. 1A and 1B illustrate an exemplary use case to which AVCD arrangements may be applied. The overall goal is to monitor the area in the vicinity of a gas pipeline 110 for changes due to faults, environmental threats, security threats or other factors that may interfere with its operation. In this example, the query and reference videos are captured by a video camera 135 mounted on an airborne drone 130 as illustrated in FIG. 1A. In one arrangement, the drone 130 carries a computer system on which AVCD arrangements may be applied. In another arrangement, the videos captured by the camera 135 are transferred wirelessly or downloaded onto a remote computer system on which AVCD arrangements may be applied.

To capture the reference video, the drone 130 is deployed near the pipeline 110 and navigates along a pre-determined path 120 while recording a video of the area 140 in the vicinity of the pipeline 110. At a later time, a query video is captured by deploying the drone 130 to follow a path 125 (which is similar to the reference path 120) while recording a video of the area 140 in the vicinity of the pipeline 110. In practice, the paths 120 and 125 are unlikely to be identical even if the drone navigates using the same waypoints during both deployments, due to inaccuracies in localization and flight control. Thus the reference video and query video capture the scene from somewhat different viewpoints.

In the example shown in FIG. 1B, a vehicle 150 enters the area 140 in the vicinity of the pipeline 110 during the time after capturing the reference video and before capturing the query video. A computer system compares the reference and query videos, detects the change in the scene due to the presence of the vehicle, and triggers an appropriate response. Examples of appropriate responses include the computer system applying additional analyses to the query and reference videos to classify the scene change, the computer system sending information about the detected change to a user, and the like.

This exemplary AVCD arrangement applies to a range of applications both within and outside the field of video surveillance. In one application, the cameras are mounted on a ground vehicle, such as a truck or train, and are used to monitor transport infrastructure such as roads or train lines for defects. In another application, the reference sequence comprises images of healthy internal tissues in a patient captured using a medical imaging method such as a CT scan, and a query image represents the same internal tissues captured at a later time. AVCD arrangements are applied to detect changes in the tissues that may indicate a health risk. In yet another application, the reference sequence comprises images of correctly fabricated batches of integrated circuits captured during a particular point in the fabrication process. AVCD arrangements are applied to query images of later batches in order to detect fabrication defects.

Overview

Disclosed are AVCD arrangements that include the steps of capturing a reference image sequence and a query image, training a reconstruction model based on the reference images, reconstructing the query image using the trained reconstruction model, and comparing the query image to the reconstructed query image to detect a scene change. The disclosed AVCD arrangements do not require the reference image sequence and query image to capture the scene from an identical viewpoint or under identical environmental conditions. Furthermore, the disclosed AVCD arrangements do not require a temporal or spatial alignment of the query image to the reference images. This is because AVCD arrangements compare the query image to a reconstructed query image, which are already aligned to each other and have the same viewpoint and environmental conditions. Finally, the disclosed AVCD arrangements can be implemented with a fixed computational cost for the comparison and detection steps, independent of the length of the reference sequence.

FIGS. 3A, 3B, 3C and 3D collectively illustrate an example of comparing a reference image sequence and a query image in order to detect a scene change, according to one AVCD arrangement. The reference images are collectively used to train a reconstruction model.

FIG. 3A illustrates an example of a single image frame 310 of the reference image sequence, where the single image frame 310 comprises a patch 312. In one AVCD arrangement, the reconstruction model includes the step of predicting the pixel values in the patch 312 based on features extracted from pixels in the annulus-like region 316. The annulus-like region 316 is bounded by the boundary of the patch 312 and the boundary of a larger concentric patch 315. Examples of a patch prediction method include a dictionary learning model, an artificial neural network (also known as a deep neural network), and the like. In one AVCD arrangement, the reconstruction model is trained using multiple patches extracted from multiple reference images.

FIG. 3B illustrates an example of a query image 320, showing the same part of the scene as the reference image 310 in FIG. 3A. During the time between capturing the reference image 310 and the query image 320, the scene changed due to the appearance of a vehicle 327.

FIG. 3C illustrates an example of a reconstructed query image 330 computed by processing the query image 320 using the reconstruction model trained on the reference images, including the reference image 310 in FIG. 3A. A pixel value 333 in the reconstructed query image 330 is determined in part by predicting a patch 332 containing the pixel 333. The patch 332 is predicted based on the features extracted from pixels in the annulus-like region between the corresponding patch 322 at the same location in the query image 320 and a larger concentric patch 325 in the query image 320. The reconstruction process is applied to all pixel locations in order to determine the full reconstructed query image 330. The vehicle 327 in query image 320 does not appear in the reconstructed query image 330, since the vehicle 327 cannot be predicted by a reconstruction model trained on the reference image 310 in which the vehicle 327 does not appear.

FIG. 3[D] illustrates an example of a change mask 340 determined by comparing the reconstructed query image 330 in FIG. 3C to the query image 320 in FIG. 3B. In one AVCD arrangement, the value at a pixel location 343 in the change mask 340 is a binary value determined by computing the absolute difference between the value at the corresponding pixel location 333 in the reconstructed query image 330 and the corresponding pixel location 323 in the query image 320, and applying a threshold.

For the example in FIG. 3D, the pixel value at location 343 in the change mask is assigned a binary value of 1 since the pixel at 333 in the reconstructed query image 330 does not match the pixel at 323 in the query image 320. Conversely, the pixel at 344 in the change mask 340 is assigned a binary value of 0 since the pixel at 334 in the reconstructed query image 330 matches the pixel at 324 in the query image 320.

Structural Context

Figure 2A:
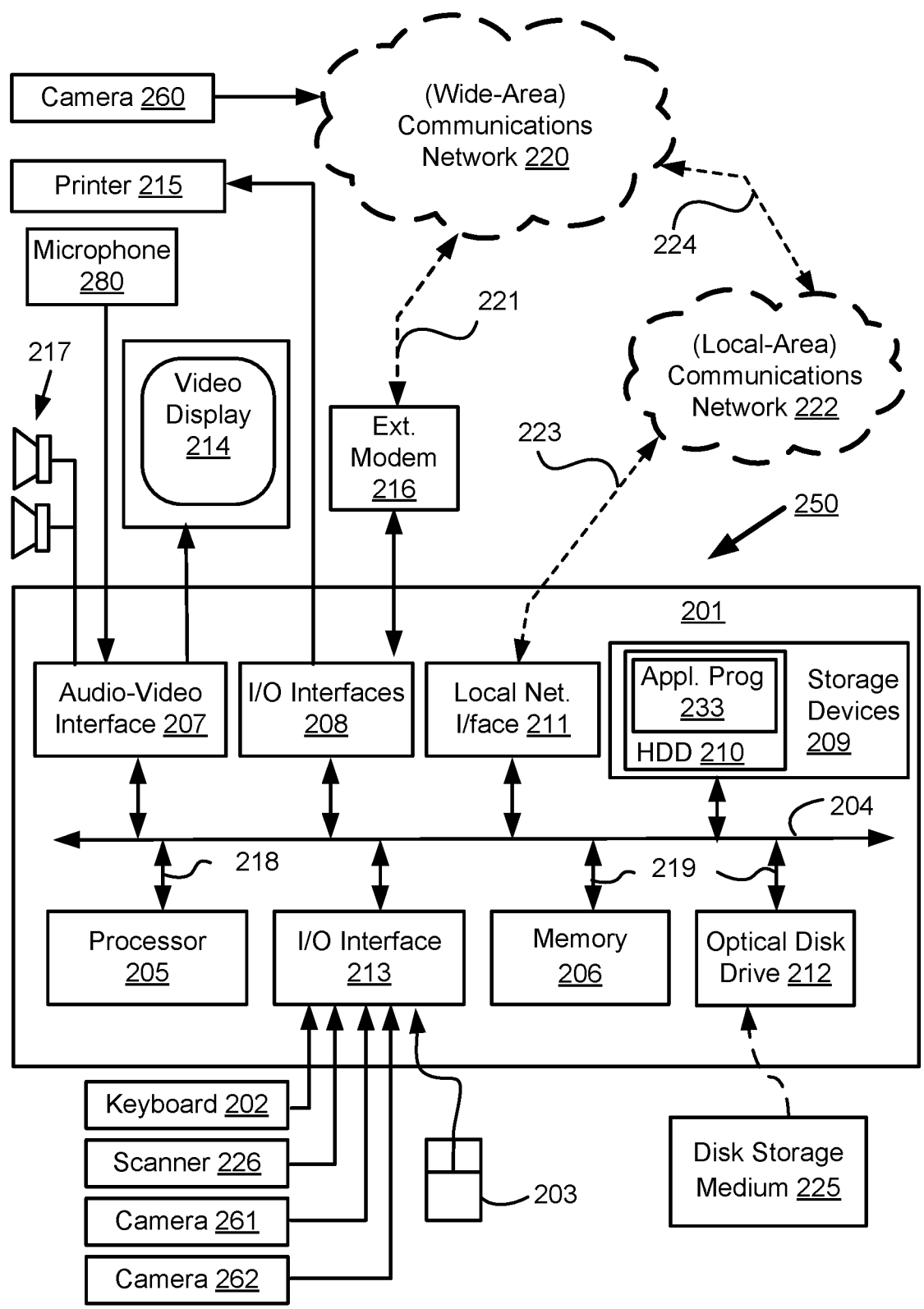
FIGS. 2A and 2B form a schematic block diagram of a general purpose computer system upon which AVCD arrangements described can be practiced.
Figure 2B:
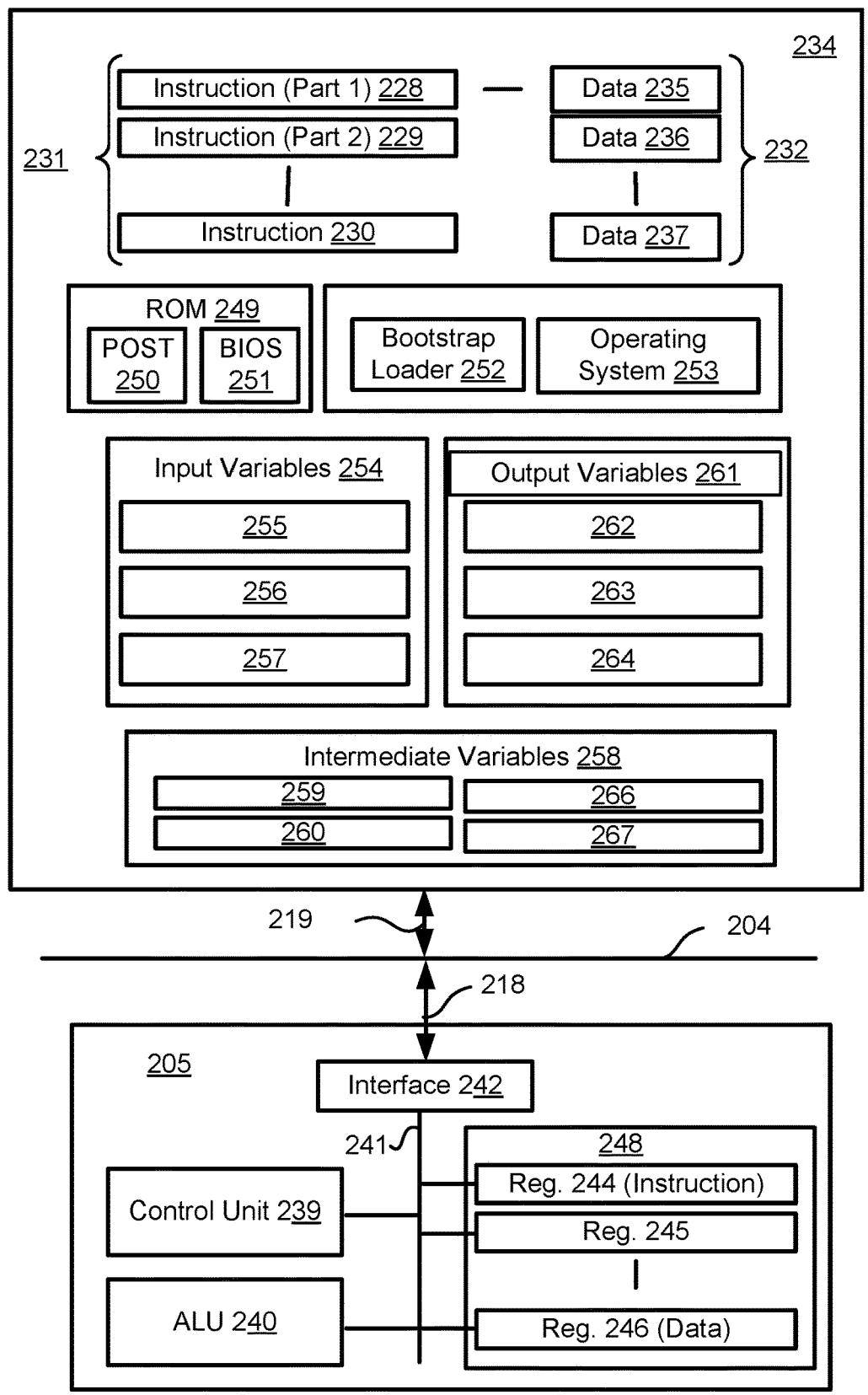

FIGS. 2A and 2B depict a general-purpose computer system 250, upon which the various AVCD arrangements described can be practiced.

As seen in FIG. 2A, the computer system 250 includes: a computer module 201; input devices such as a keyboard 202, a mouse pointer device 203, a scanner 226, one or more cameras such as the cameras 261 and 262, and a microphone 280; and output devices including a printer 215, a display device 214 and loudspeakers 217. An external Modulator-Demodulator (Modem) transceiver device 216 may be used by the computer module 201 for communicating to and from remote cameras such as 260 over a communications network 220 via a connection 221.

The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 261 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 250 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practised for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 250.

The components 205 to 213 of the computer module 201 typically communicate via an interconnected bus 204 and in a manner that results in a conventional mode of operation of the computer system 250 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer system.

The AVCD method may be implemented using the computer system 250 wherein the processes of FIGS. 4, 5, 7, and 9 to be described, may be implemented as one or more AVCD software application programs 233 executable within the computer system 250. In particular, the steps of the AVCD method are effected by instructions 231 (in FIG. 2B) in the software 233 that are carried out within the computer system 250. The software instructions 231 may be formed as one or more code modules, each for performing one or more particular tasks. The software may also be divided into two separate parts, in which a first part and the corresponding code modules performs the AVCD methods and a second part and the corresponding code modules manage a user interface between the first part and the user.

The AVCD software may be stored in a computer readable medium, including the storage devices described below, for example. The software is loaded into the computer system 250 from the computer readable medium, and then executed by the computer system 250. A computer readable medium having such software or computer program recorded on the computer readable medium is a computer program product. The use of the computer program product in the computer system 250 preferably effects an advantageous apparatus for implementing the AVCD method.

The software 233 is typically stored in the HDD 210 or the memory 206. The software is loaded into the computer system 250 from a computer readable medium, and executed by the computer system 250. Thus, for example, the software 233 may be stored on an optically readable disk storage medium (e.g., CD-ROM) 225 that is read by the optical disk drive 212. A computer readable medium having such software or computer program recorded on it is a computer program product. The use of the computer program product in the computer system 250 preferably effects an apparatus for practicing the AVCD arrangements.

In some instances, the AVCD application programs 233 may be supplied to the user encoded on one or more CD-ROMs 225 and read via the corresponding drive 212, or alternatively may be read by the user from the networks 220 or 222. Still further, the software can also be loaded into the computer system 250 from other computer readable media. Computer readable storage media refers to any non-transitory tangible storage medium that provides recorded instructions and/or data to the computer system 250 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 250 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 250 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 250 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The AVCD application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed AVCD arrangements use input variables 254, which are stored in the memory 234 in corresponding memory locations 255, 256, 257. The AVCD arrangements produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 7, and 8 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The AVCD method may alternatively be implemented in dedicated hardware such as one or more integrated circuits performing the AVCD functions or sub functions. Such dedicated hardware may include graphic processors, digital signal processors, or one or more microprocessors and associated memories, and may reside on platforms such as video cameras.

AVCD Method

Figure 4:
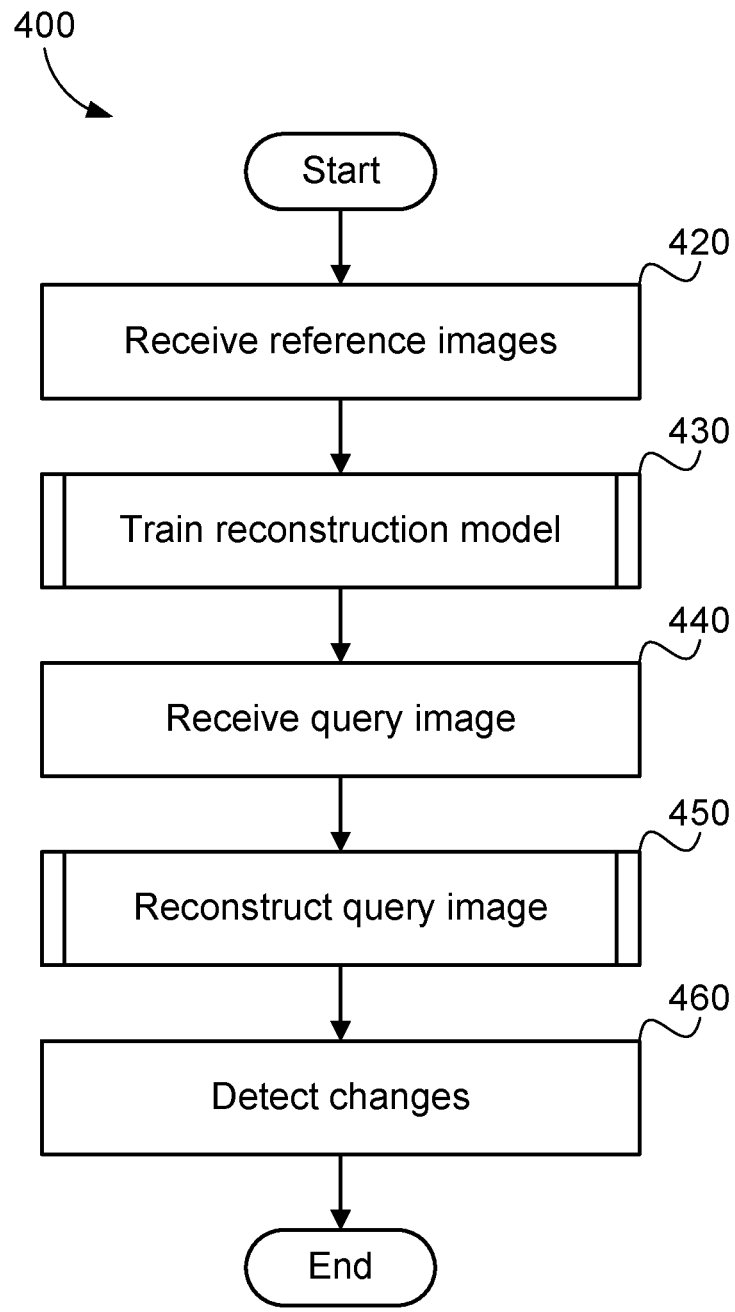
FIG. 4 is a schematic flow diagram illustrating a method of detecting a change in a scene according to one AVCD arrangement.

FIG. 4 shows a method 400 of detecting a change in a scene by comparing a reference image sequence and a query image, according to one AVCD arrangement. The method 400 may be implemented as one or more software code modules of the software application program 233 resident in the hard disk drive 210 and being controlled in its execution by the processor 205. The following description provides details, examples and alternative implementations for the main steps of method 400. Further details, examples and alternative implementations of sub-processes 430 and 450 are described later with reference to FIGS. 5 and 7 respectively.

Method 400 starts at the first retrieving step 420, wherein a set of reference images is received as input. In one example, the references images show a scene captured by a moving camera mounted on a drone navigating along a pre-determine path. In this example, where the camera is moving, the references images capture the scene from different viewpoint from each other. In another example, the reference images are captured by a medical imaging device and show healthy tissue in a patient.

Control then passes from step 420 to training sub-process 430, which trains a reconstruction model based on the reference images. The reconstruction model can then be used to determine a reconstructed query image of a query image, such that the reconstructed query image contains aspects of the scene structure in the query image that were present in the reference images. Aspects of the scene that were not present in the reference images are not displayed in the reconstructed query image. Accordingly, the function of the training process is in part to learn the scene structure represented in the reference images. Further details, examples and alternative implementations of sub-process 430 are described later with reference to FIG. 5.

Control then passes from sub-process 430 to the second receiving step 440, which receives a query image corresponding to the same scene as the reference images. The query image is captured at a different time to the reference images. In one AVCD arrangement, due to the capture process the query image captures the same scene as the reference images from a somewhat different viewpoint. In one example, the query image shows a scene captured by a moving camera mounted on a drone navigating along a pre-determined path similar to a path previously used to capture a reference image sequence. In another example, the query image shows tissues in a patient that were previously captured in reference images using same medical imaging device.

In one arrangement, steps 420 and 440 can be implemented before sub-process 430. Therefore, in this arrangement, steps 420 and 440 are performed before sub-process 430. Once sub-process 430 is completed, the method 400 in this arrangement proceeds to step 450.

Control then passes from step 440 to reconstructing sub-process 450, which determines a reconstructed query image based on the query image received at step 440 and the reconstruction model trained on the references images at sub-process 430. The reconstructed query image contains aspects of the scene structure in the query image that were present in the reference images. Aspects of the scene that changed between the capture of the reference images and the query image are not reconstructed. Further details, examples and alternative implementations of step 450 are described later with reference to FIG. 7.

Control then passes from sub-process 450 to detecting step 460, which determines a scene change based on the query image received at step 440 and the reconstructed query image determined at sub-process 450. In one AVCD arrangement, as illustrated in FIGS. 3[B], 3[C] and 3[D], detecting step 460 determines a change mask 340 by comparing a query image 320 to the corresponding reconstructed query image 330 determined at sub-process 450. The value at a pixel location 343 in the change mask 340 is a binary value determined by computing the absolute difference between the value at the corresponding pixel location 333 in the reconstructed query image 330 and the corresponding pixel location 323 in the query image 320, and applying a threshold. An example of applying a threshold is to assign a binary value of 1 if the difference is greater than 30 and a value of 0 otherwise. A change in the scene is determined to have occurred at pixel locations in the change mask containing a non-zero value.

Embodiments of step 460 that involve post-processing the change mask before determining a scene change may equally be practised at step 460. In one alternative AVCD arrangement, a set of morphological filtering operations are applied to the binary change mask to remove noise. An example of a morphological filtering operation is a binary erosion. Another example of a morphological filter operation is a binary dilation. In another alternative AVCD arrangement, a connected-component analysis is applied to the change mask to identify distinct regions. In yet another alternative AVCD arrangement, the area of each detected object is determined, and any regions with an area less than a fixed area threshold is discarded by setting the corresponding pixel values in the binary mask to zero. An example of a fixed area threshold is 10 square pixels. In yet another alternative AVCD arrangement, additional features of a detected region are computed. One example of an additional feature is a centroid. Another example of an additional feature is a bounding box. Yet another example of an additional feature is a second moment of area. Rules are applied to the additional features to determine whether the corresponding region should be discarded. An example of a rule is to discard a region if the centroid lies outside an area of interest (AOI) in the image. One example of an AOI is a bounding box specified in an image by a user, indicating a region of the image in which the user wishes to detect a change.

Method 400 concludes after completing the detecting step 460.

Figure 5:
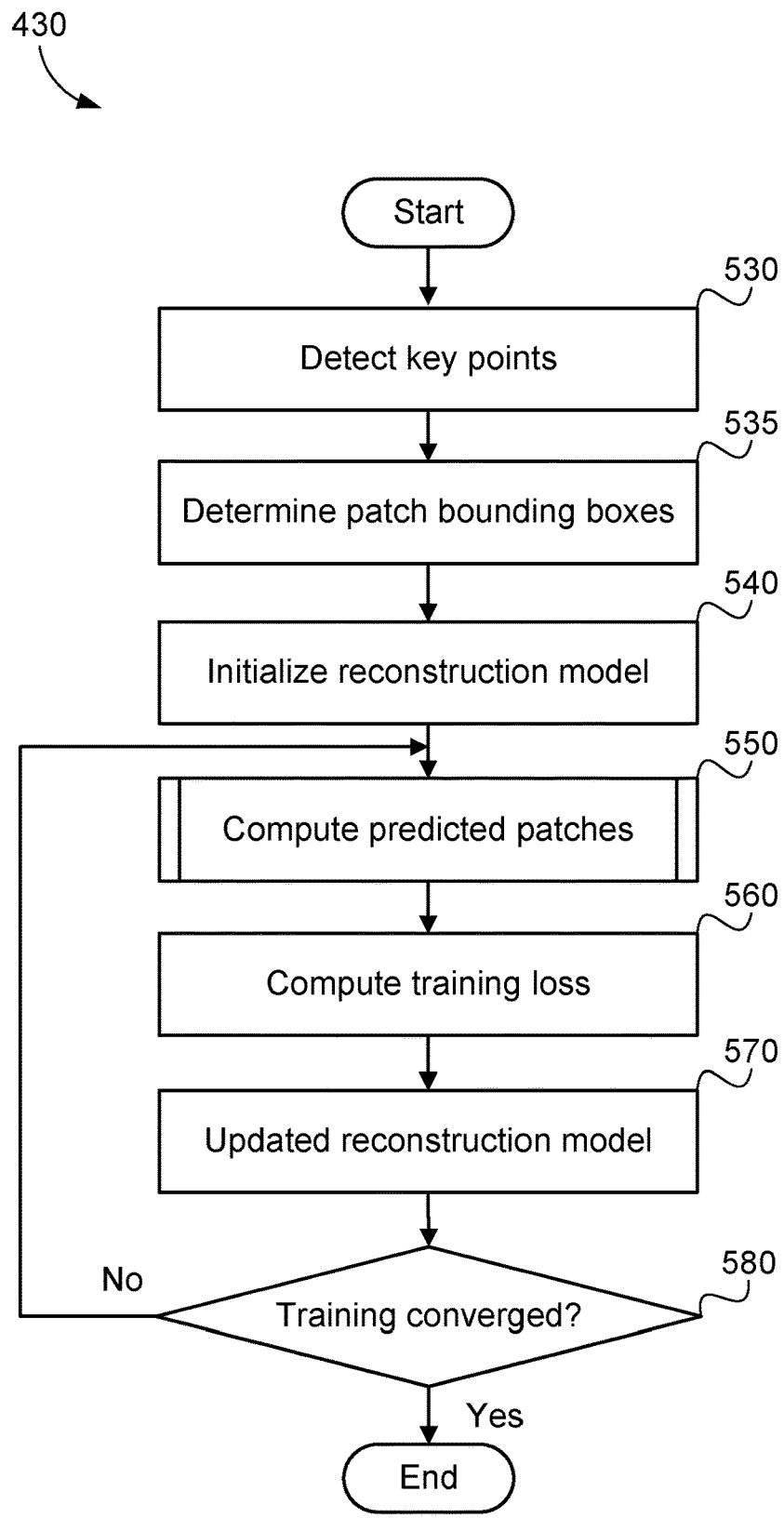
FIG. 5 is a schematic flow diagram illustrating a sub-process of training a reconstruction model based on a set of reference images as used in the method of FIG. 4.

FIG. 5 shows sub-process 430 to train a reconstruction model based on a sequence of reference images. Sub-process 430 will now be described using the illustrative example from FIG. 6. Sub-process 430 may be implemented as one or more software code modules of the software application program 233 resident in the hard disk drive 210 and being controlled in its execution by the processor 205. The following description provides details, examples and alternative implementations for the main steps of sub-process 430.

Sub-process 430 starts at detecting step 530, which detects key points in each of the reference images received at step 420. A "key point" in an image is a local image structure that has a well-defined location and can be detected with high repeatability despite local perturbations such as brightness change or geometric deformation. One example of a key point is a "corner", which is a local image structure characterised by image gradients in multiple directions.

Another example of a key point is a "blob", which is a local image structure characterised by high contrast between a central region and surrounding region. Key points can be detected using a corner detection method, a blob detection method, and the like. Examples of a corner detection method include a Harris corner detector, a FAST corner detector, a Shi-Tomasi corner detector, and the like. Examples of a blob detection method include a difference of Gaussians (DOG) blob detector, a maximally stable extremal regions (MSER) detector, and the like.

In one AVCD arrangement, a key point detector applied at step 530 generates a response value associated with each detected key point. The response value indicates the strength of the response of the key point to the key point detector. The key point detector is applied to the whole image and key points with a response value less than a fixed threshold are discarded. An example of a fixed threshold is 0.001 for a DOG corner detector.

In another AVCD arrangement, the image is divided into a grid of non-overlapping cells of fixed dimension, and the detected key point with the highest response value in each grid cell is retained, while all other key points are discarded. An example of a fixed dimension is 16×16 pixels.

Control then passes from step 530 to determining step 535, which determines one or more patch bounding boxes on each of the reference images. In one AVCD arrangement, a patch bounding box is determined for each key point detected in step 530. With reference to the illustrative example in FIG. 6, a patch bounding box 620 in a reference image 600 is determined as a square of fixed dimension centred on a key point 610. Therefore, the above arrangements determine the patch bounding boxes based on the detected key points.

In another AVCD arrangement, a patch bounding box is determined at every pixel location in a reference image as a rectangle of fixed dimension centred on a pixel location. In yet another AVCD arrangement, a set of non-overlapping patch bounding boxes is determined at step 535 by dividing the reference image into a regular grid of square patches of fixed dimension. An example of a fixed dimension is 16×16 pixels.

Control then passes from step 535 to initializing step 540, which initializes a reconstruction model. In one AVCD arrangement, the reconstruction model is a convolutional deep neural network and the weights in the convolutional deep neural network are initialized randomly. In another AVCD arrangement, the weights in a deep neural network are initialized in part by retrieving the weights from a deep neural network previously trained on a different task. An example of a different task is image classification. Practitioners in the art will recognize that other methods for initializing the weights in a deep neural network may be equally practised at step 540.

Control then passes from step 540 to predicting sub-process 550, which uses the reconstruction model to compute a predicted patch for each patch determined at step 535. Consequently, the reconstruction model used in the first execution of step 550 is the model initialized at step 540. The reconstruction model used in subsequent executions of step 550 is the model updated at step 570 (described below).

In one AVCD arrangement, the predicted image patches are determined by processing the reference images using a convolutional deep neural network (i.e., the reconstruction model), and selecting the activations from the output layer of the convolutional deep neural network that correspond to the patch bounding boxes determined at step 535. Further details, examples and alternative implementations of sub-process 550 are described later with reference to method 900 in FIG. 9.

Control then passes from sub-process 550 to computing step 560, which computes a training loss based on the patches determined at step 535 and the predicted patches determined at sub-process 550. In one AVCD arrangement, a training loss, known as a squared error loss, is computed as the sum over all pixels in all patch bounding boxes of the squared difference between a pixel in a patch from a reference image (determined at step 535) and a pixel at the same location in a corresponding predicted patch (computed at sub-process 550).

In another AVCD arrangement, a training loss, known as a binary cross-entropy loss, is computed as the negative of the sum over all pixels in all patch bounding boxes of the product of a pixel value in a predicted patch and the logarithm of a pixel value at the same location in a corresponding patch from a reference image. Practitioners in the art will recognize that other training losses may equally be computed at step 560.

Control then passes from step 560 to updating step 570, where the reconstruction model is updated based on the training loss determined at step 560. In one AVCD arrangement, the reconstruction model is a deep neural network and the weights in the model are updated by applying one iteration of an iterative optimization algorithm. One example of an iterative optimization algorithm is stochastic gradient descent, based on gradients of the loss function determined using backpropagation. Another example of an iterative optimization algorithm is AdaGrad. Practitioners in the art will recognize that one iteration of other iterative optimization algorithms may equally be computed at step 560.

Control then passes from step 570 to determining step 580, which determines whether training has converged and should be terminated. In one AVCD arrangement, training is determined to have converged if the number of training iterations, that is the number of repetitions of steps 550, 560 and 570, exceeds a fixed iteration threshold. An example of a fixed iteration threshold is 250 iterations.

In another AVCD arrangement, training is determined to have converged if the training loss determined at step 560 is below a fixed loss threshold. An example of a fixed loss threshold for a binary cross-entropy loss is 0.6. Practitioners in the art will recognize that other convergence criteria may equally be applied at step 570.

If training is determined to have not converged (NO), control then passes from step 580 to predicting sub-process 550. If training is determined to have converged (YES), sub-process 430 concludes.

Practitioners in the art will recognize that variations in the sub-process 430 for training a reconstruction model may equally be practised. In one alternative embodiment of sub-process 430, the training data is augmented by creating additional reference images based on one or more randomized transformations of the reference images received at step 420. Examples of a randomized transformation include a random rotation of a reference image, a random scaling of a reference image, a translation of a reference image, a random gamma correction applied to a reference image, and the like. Practitioners in the art will recognize that other randomized transformations may equally be applied to generate augmented training data.

In another alternative embodiment of sub-process 430, step 540 initializes multiple instances of the reconstruction model with different random initializations. The training process of steps 550, 560, 570 and 580 is applied to each of the multiple instances of the reconstruction model independently. Finally, an additional selecting step (not shown in FIG. 5) selects the instance of the reconstruction model with the lowest training loss and discards the other instances of the reconstruction model.

Figure 6:
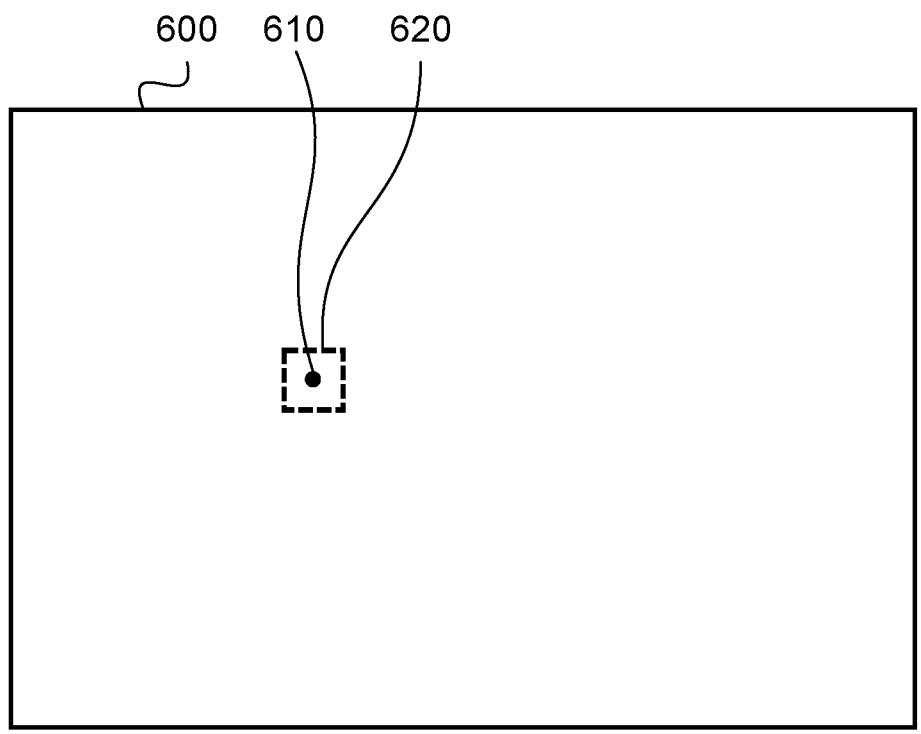
FIG. 6 illustrates an example of forming an image patch around a key point according to the sub-process of FIG. 5.
Figure 7:
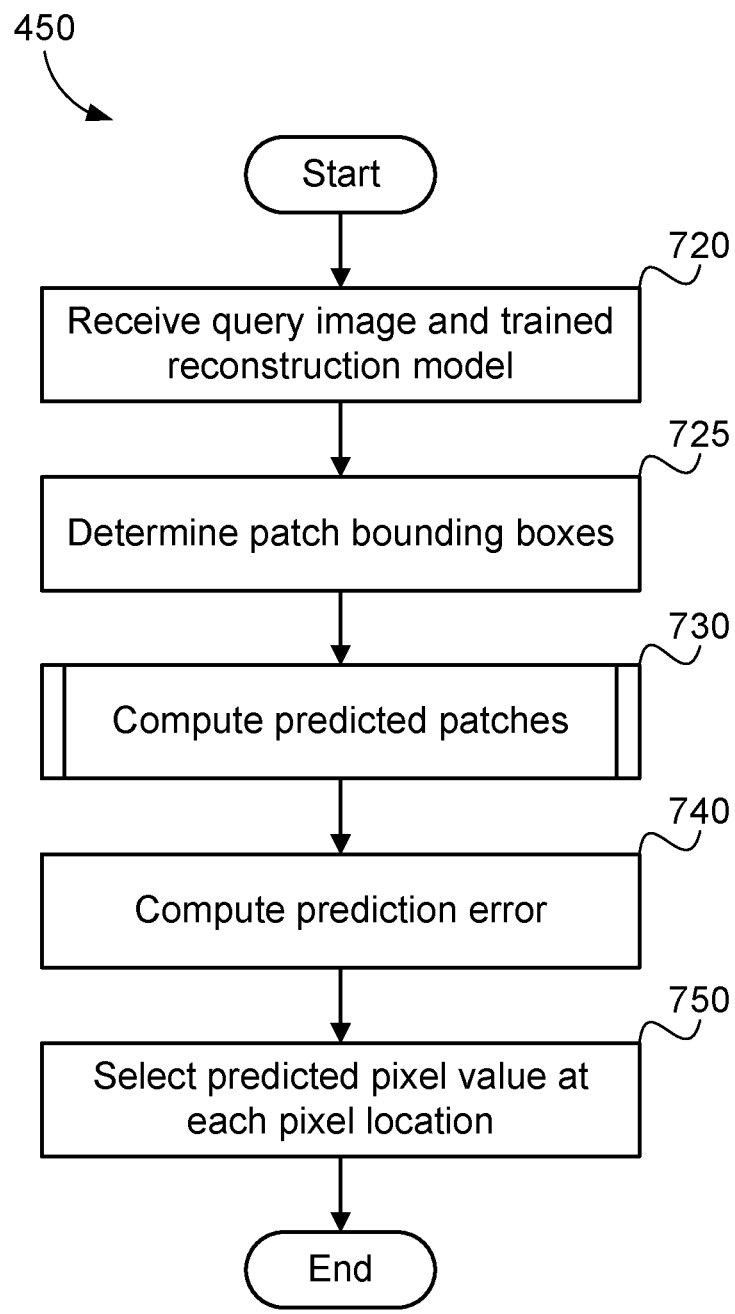
FIG. 7 is a schematic flow diagram illustrating a sub-process of reconstructing a query image based on a trained reconstruction model as used in the method of FIG. 4.

FIG. 7 shows sub-process 450 of reconstructing a query image based on a reconstruction model trained using sub-process 430 of FIG. 5. Sub-process 450 will now be described using the illustrative examples from FIG. 6 and FIG. 8. Sub-process 450 may be implemented as one or more software code modules of the software application program 233 resident in the hard disk drive 210 and being controlled in its execution by the processor 205. The following description provides details, examples and alternative implementations for the main steps of method 700.

Sub-process 450 starts at the retrieving step 720, wherein a query image (received at step 440 of the method 400) and a reconstruction model (trained using sub-process 430 in FIG. 5) are received as input.

Control then passes from step 720 to determining step 725 which determines a set of patch bounding boxes on the query image received at step 720. The set of patch bounding boxes comprises one or more patch bounding boxes. In one AVCD arrangement, a patch bounding box is determined at every pixel location in the query image. The patch bounding box is determined in a similar manner as illustrated in FIG. 6. In FIG. 6, a patch bounding box 620 at pixel location 610 of the reference image 600 is determined as a square boundary of fixed dimension centred on the pixel location 610. An example of a fixed dimension is 16×16 pixels.

Control then passes from step 725 to detecting sub-process 730, which computes a predicted patch corresponding to each patch bounding box determined at step 725 based on the reconstruction model trained using sub-process 430 in FIG. 5. Sub-process 730 shares embodiments with sub-process 550 of sub-process 430 in FIG. 5. Further details, examples and alternative implementations of sub-process 730 are described later with reference to method 900 in FIG. 9.

Control then passes from step 730 to computing step 740, which computes a prediction error for each predicted patch determined at step 730. In one AVCD arrangement, a prediction error is computed as a distance between a patch in the query image received at step 720 and the corresponding predicted patch determined at step 730. In one AVCD arrangement, the computed distance is the sum over the squared difference between corresponding pixels in the pair of patches from steps 725 and 730. In another AVCD arrangement, the computed distance is a normalized cross-correlation between the pair of patches from steps 725 and 730. Practitioners in the art will recognize that other distance measures may equally be computed at step 740.

Control then passes from step 740 to selecting step 750, which reconstructs the query image by selecting a pixel value at each pixel location based on the patches predicted at step 730 and the prediction errors computed at step 740. FIG. 8 illustrates selecting a pixel value at a location 810 in a reconstructed query image 800. In one AVCD arrangement, a pixel value is selected based on a single patch prediction. In one example, the centre pixel of the predicted patch 830 is selected and stored at location 810 in the reconstructed query image 800.

In another AVCD arrangement, a pixel value is selected based on multiple predictions. Firstly, the set of all predicted patches containing a pixel location 810 within their bounding box, for example the patches 820 and 830, is determined. Then, the patch with the smallest prediction error determined at step 740 is selected from this set. Finally, the pixel value predicted at location 810 by the selected patch is stored in the reconstructed query image at location 810.

Practitioners in the art will recognize that variations of the embodiments described above for sub-process 450 may equally be practised. In one alternative AVCD arrangement, multiple patches containing pixel 810 are selected at step 750 based on a selection criterion. One example of a selection criterion is that the corresponding prediction error determined at step 740 is below a fixed threshold. An example of a fixed threshold is 0.1. In this arrangement, a function of the selected patches is determined and stored at location 810 in the reconstructed query image. One example of a function is a mean predicted value at location 810. Another example of a function is a median predicted value at location 810. In another alternative AVCD arrangement, a set of non-overlapping patch bounding boxes are determined at step 725 by dividing the query image into a regular grid of square patches of fixed dimension. In this arrangement, each pixel location is predicted at step 730 by a single patch in the grid. At step 750, the pixel value at each location in the reconstructed query image is taken from the corresponding predicted patch.

Sub-process 450 concludes after completing the selecting step 750.

Figure 9:
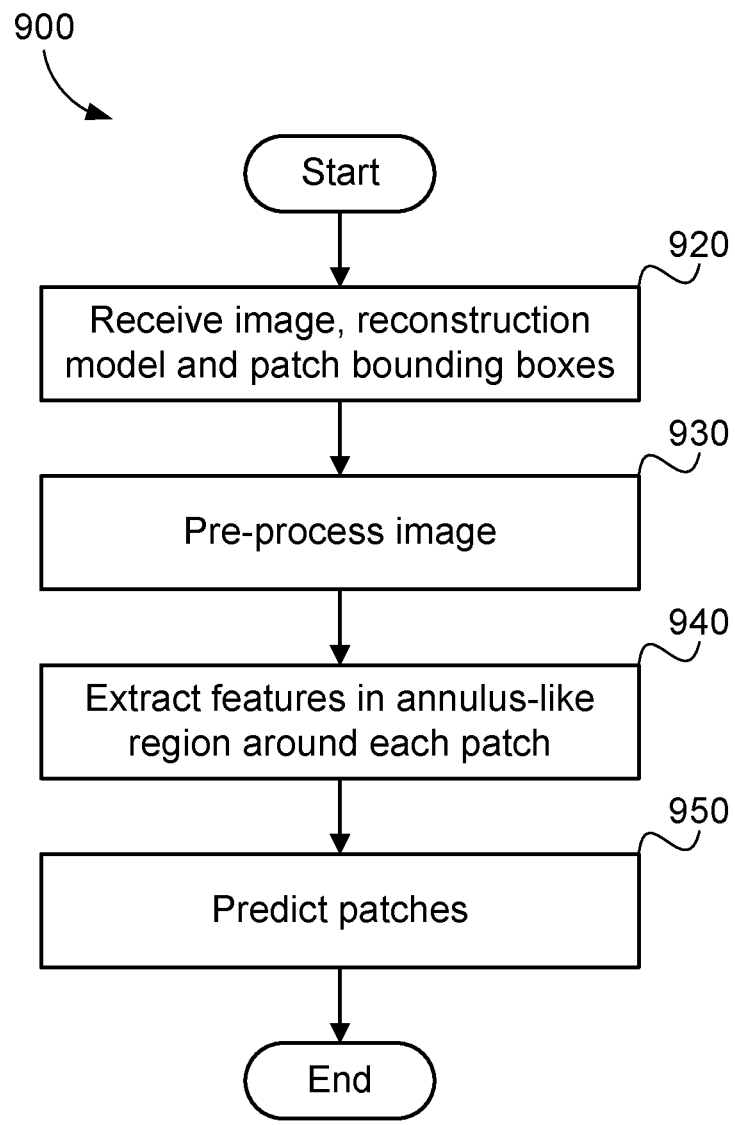
FIG. 9 is a schematic flow diagram illustrating a sub-process of predicting a patch as used in the sub-processes of FIG. 5 and FIG. 7.

FIG. 9 shows a method 900 of predicting a patch based on a reconstruction model trained using sub-process 430 of FIG. 5. The method 900 is used by sub-process 550 shown in FIG. 5 and sub-process 730 shown in FIG. 7. Method 900 will now be described using the illustrative example from FIG. 10. Method 900 may be implemented as one or more software code modules of the software application program 233 resident in the hard disk drive 210 and being controlled in its execution by the processor 205.

Method 900 starts at the retrieving step 920, wherein an image (either a reference image for sub-process 430 or a query image for sub-process 450), a reconstruction model trained (or initialized) using sub-process 430 in FIG. 5 and a set of patch bounding boxes (see steps 535 and 725) are received as input.

Control then passes from step 920 to pre-processing step 930, which applies pre-processing to the received image. In one AVCD arrangement, the pixels values in the received image are transformed into a particular colour space, such as an intensity colour space, a CIELAB colour space, and the like. In another AVCD arrangement, the received image is cropped and resized to a fixed dimension, such as 256×256 pixels. In yet another AVCD arrangement, the image is filtered using a noise-reducing filter, such as a Gaussian blur filter with a standard deviation of 2 pixels. In yet another AVCD arrangement, the pre-processing step 930 does not perform any pre-processing of the image.

Control then passes from step 930 to extracting step 940, which extracts features from an annulus-like region surrounding each patch based on the reconstruction model and patch bounding boxes received at step 920, and the pre-processed image determined at step 930. The annulus-like region surrounding each patch can be as defined by the region 316 between the patch 312 and patch 315 as shown in FIG. 3A.

Figure 10:
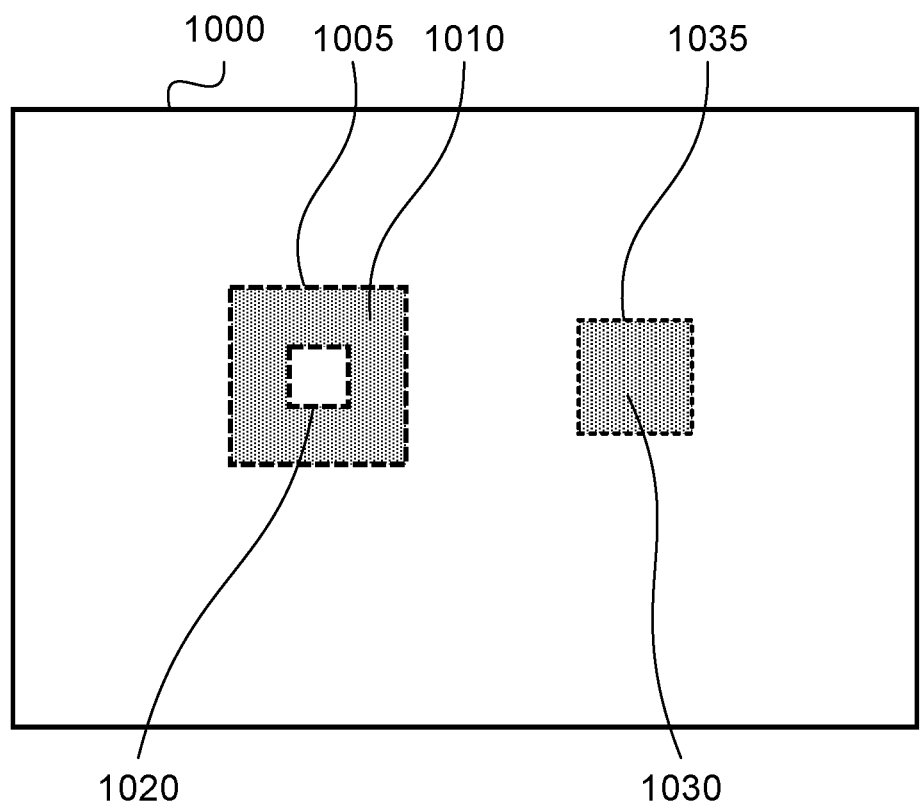
FIG. 10 illustrates an example of forming a donut-shaped region around an image patch as used in the method of FIG. 9.

In one AVCD arrangement, feature extraction is implemented as a convolutional deep neural network where one or more layers has an annulus-shaped convolutional filter. FIG. 10 illustrates an example of a square convolutional filter 1030 and an annulus-shaped convolution filter 1010 applied to an image 1000. The shape of a square convolutional filter 1030 is defined by a bounding box 1035, and the square convolutional filter only contains non-zero weights in the shaded region inside the bounding box 1035. The shape of an annulus-shaped convolutional filter 1010 is defined by an outer bounding box 1005 and an inner bounding box 1020. The annulus-shaped convolutional filter 1010 only contains non-zero weights in the shaded region between the outer bounding box 1005 and inner bounding box 1020.

In one example of a convolutional deep neural network used to extract features, the input layer is a single-channel grayscale image. The next layer has 64 square convolutional filters of dimension 3×3×1, applied with a stride of 1 and a rectified linear unit (ReLU) activation. The next layer has 64 square convolutional filters of dimension 3×3×64, applied with a kernel dilation of 1, a stride of 1 and ReLU activation. The next layer applies max-pooling with a pooling kernel of dimension 2×2 and stride of 1. The next layer has 128 square convolutional filters of dimension 3×3×64, applied with a kernel dilation of 2, a stride of 1 and a ReLU activation. The next layer applies max-pooling with a pooling kernel of dimension 2×2, applied with a kernel dilation of 2 and stride of 1. The next layer has 192 square convolutional filters of dimension 3×3×128, applied with a kernel dilation of 4, a stride of 1 and a ReLU activation. The next layer applies max-pooling with a pooling kernel of dimension 2×2, applied with a kernel dilation of 4 and stride of 1. The next layer has 384 square convolutional filters of dimension 3×3×192, applied with a kernel dilation of 8, a stride of 1 and a ReLU activation. The next layer applies max-pooling with a pooling kernel of dimension 2×2, applied with a kernel dilation of 8 and stride of 1. The next layer has 768 annulus-shaped convolutional filters with an outer dimension of 7×7, an inner dimension of 3×3, applied with a kernel dilation of 16, a stride of 1 and a ReLU activation. The features extracted at step 940 of method 900 are the activations of the annulus-shaped filters. Convolutional filters at all layers are applied with zero padding so that a feature is determined for every location in the image received at step 920.

Practitioners in the art will recognize that variations on the convolutional deep neural network embodiment described above may equally be practised. In one alternative embodiment, batch normalization is applied between each convolutional layer. In another alternative embodiment, a ReLU activation is replaced with a different activation function. One example of an activation function is a linear activation. Another example of an activation function is a Sigmoid activation. In another alternative embodiment, the max-pooling layers are replaced with a different pooling function. An example of a pooling function is an average pooling. In another alternative embodiment, an annulus-shaped filter is defined by an outer bounding box and has weights that gradually reduce to zero at the centre of the filter. In one example, the filter weights are the product of learned weights and a two-dimensional inverse Gaussian function centred on the bounding box. The inverse Gaussian function is defined as one minus a Gaussian function with a fixed standard deviation. An example of a fixed standard deviation is one tenth of the width of the outer bounding box.

Control then passes from step 940 to predicting step 950, which computes a predicted image patch corresponding to each patch bounding box received at step 920, based on the features extracted at step 940. In one AVCD arrangement, the reconstruction model is a convolutional deep neural network, and the predicting step is implemented using network layers applied to the output of a feature extraction network. In one example, the prediction network comprises a layer of 256 convolutional filters of dimension 1×1×768. The output of a convolutional filter is mapped to a bounded interval using a bounded activation function. An example of bounded activation function is a sigmoid activation that bounds the output to the range [0, 1]. Finally, a predicted patch is formed by reshaping the output activations according to the dimensions of a patch received at step 920. In one example, the 256 output activations at a particular location are reshaped into a 16×16 patch corresponding to a predicted patch at that location. Practitioners in the art will recognize that other fixed filter dimensions and activation functions may equally be used in a convolutional deep neural network at step 950.

Method 900 concludes after completing the predicting step 950.

The above description of sub-processes 430 and 450 and method 900 provide embodiments with examples based on a convolutional deep neural network reconstruction model. Practitioners in the art will recognize that other machine learning models may equally be used as a reconstruction model in alternative embodiments of sub-processes 430 and 450 and method 900. In one alternative AVCD arrangement, a reconstruction model is based on dictionary learning using a dictionary with a fixed number of atoms. One example of a fixed number is 1024 atoms. In one embodiment of step 540 of sub-process 430, the dictionary atoms are initialized randomly. In another embodiment of step 540 of sub-process 430, the dictionary atoms are initialized by applying K-singular value decomposition (K-SVD). In one embodiment of step 570 in sub-process 430, the dictionary is updated by applying one iteration of an alternating minimization algorithm. In one embodiment of step 940 of method 900, a feature of fixed dimension is computed by vectorising the pixel values in a patch bounding box received at step 920. An example of a fixed dimension is 256, corresponding to the vectorization of grayscale pixel values in a 16×16 pixel bounding box. In one embodiment of step 950 of method 900, a patch is predicted by computing a dictionary encoding based on a feature computed at step 940 and the dictionary atoms received at step 920, then reconstructing the patch by computing the sum over the product of an encoding coefficient and the corresponding dictionary atom. In one example, the dictionary encoding is determined using the least angle regression method.

The invention claimed is:

1. A method of detecting a change in a scene between images that capture a scene at different times, the images comprising reference images and a query image, the method comprising:
   reconstructing the query image using a reconstruction model, the reconstruction model being based on the reference images, wherein the reconstruction of the query image comprises:
   determining one or more patch bounding boxes on the query image;
   computing, using the reconstruction model, a predicted patch for each of the one or more patch bounding boxes of the query image;
   computing a prediction error on each of the predicted patches based on the one or more patch bounding boxes and the corresponding predicted patches of the query image; and
   reconstructing the query image by selecting a predicted pixel value at each pixel location based on the predicted patches and the corresponding prediction errors; and
   detecting a change in the scene by comparing the query image with the reconstructed query image.

2. The method of claim 1, further comprising:
   training the reconstruction model from the reference images, wherein the training comprises:
   determining one or more patch bounding boxes on each of the reference images;
   computing, using the reconstruction model, a predicted patch for each of the one or more patch bounding boxes on the reference images;
   computing a training loss based on the one or more patch bounding boxes and the corresponding predicted patches of the reference images; and
   updating the reconstruction model based on the training loss.

3. The method of claim 2, wherein the computing of the predicted patches, the computing of the training loss, and the updating of the reconstruction model are repeated until the training has converged.

4. The method of claim 2, wherein the training of the reconstruction model further comprises:
   detecting key points on each of the reference images, wherein the one or more patch bounding boxes of the reference images are determined based on the detected key points.

5. The method of claim 1, wherein the selecting of the predicted pixel value comprises:
   predicting a pixel value at a pixel location from the predicted patches having the pixel location;
   selecting a predicted patch having the smallest prediction error; and
   selecting the predicted pixel value of the selected predicted patch.

6. The method of claim 2, wherein the computing of the predicted patches comprises:
   extracting features from an annulus-like region surrounding each of the one or more patch bounding boxes of the reference images, wherein the predicted patch is computed based on the extracted features.

7. The method of claim 6, further comprising:
   pre-processing the reference images before extracting the features, such that the features are extracted from the annulus-like region surrounding each of the one or more patch bounding boxes of the pre-processed reference images.

8. The method of claim 1, wherein the computing of the predicted patches comprises:
   extracting features from an annulus-like region surrounding each of the one or more patch bounding boxes of the query image, wherein the predicted patch is computed based on the extracted features.

9. The method of claim 8, further comprising:
   pre-processing the query image before extracting the features, such that the features are extracted from the annulus-like region surrounding each of the one or more patch bounding boxes of the pre-processed query image.

10. The method of claim 1, wherein the references images capture the scene in different view points.

11. The method of claim 1, wherein the reconstruction model comprises an inverse Gaussian filter.

12. A non-transitory computer readable medium comprising computer programs for a method of detecting a change in a scene between images that capture a scene at different times, the images comprising reference images and a query image, wherein the computer programs is executable by a processor to perform the method, the method comprising:
   reconstructing the query image using a reconstruction model, the reconstruction model being based on the reference images, wherein the reconstruction of the query image comprises:
   determining one or more patch bounding boxes on the query image;
   computing, using the reconstruction model, a predicted patch for each of the one or more patch bounding boxes of the query image;
   computing a prediction error on each of the predicted patches based on the one or more patch bounding boxes and the corresponding predicted patches of the query image; and
   reconstructing the query image by selecting a predicted pixel value at each pixel location based on the predicted patches and the corresponding prediction errors; and
   detecting a change in the scene by comparing the query image with the reconstructed query image.

13. A system comprising:
   a processor;
   memory in communication with the processor, wherein the memory comprises computer programs for a method of detecting a change in a scene between images that capture a scene at different times, the images comprising reference images and a query image, wherein the computer programs is executable by a processor to perform the method, the method comprising:
   reconstructing the query image using a reconstruction model, the reconstruction model being based on the reference images, wherein the reconstruction of the query image comprises:
   determining one or more patch bounding boxes on the query image;
   computing, using the reconstruction model, a predicted patch for each of the one or more patch bounding boxes of the query image;
   computing a prediction error on each of the predicted patches based on the one or more patch bounding boxes and the corresponding predicted patches of the query image; and
   reconstructing the query image by selecting a predicted pixel value at each pixel location based on the predicted patches and the corresponding prediction errors; and
   detecting a change in the scene by comparing the query image with the reconstructed query image.

* * * * *